United States Patent [19]
Long

[11] Patent Number: 5,927,788
[45] Date of Patent: Jul. 27, 1999

[54] STATIC DISSIPATING PLASTIC TRUCK CARGO BED LINER

[75] Inventor: Theodore J. Long, Columbus, Wis.

[73] Assignee: Penda Corporation, Portage, Wis.

[21] Appl. No.: 08/895,915

[22] Filed: Jul. 17, 1997

[51] Int. Cl.⁶ .................................................. B60R 13/01
[52] U.S. Cl. ............................................................ 296/39.2
[58] Field of Search ............................................ 296/39.2

[56] References Cited

U.S. PATENT DOCUMENTS

| D. 259,928 | 7/1981 | Weis et al. | D12/98 |
|---|---|---|---|
| 3,652,123 | 3/1972 | Speers | 296/39 |
| 3,814,473 | 6/1974 | Lorenzen, Jr. | 296/39 |
| 3,881,768 | 5/1975 | Nix | 296/39 |
| 4,047,749 | 9/1977 | Lambitz et al. | 296/39 |
| 4,161,335 | 7/1979 | Nix et al. | 296/39 |
| 4,162,098 | 7/1979 | Richardson, III | 296/39 |
| 4,181,349 | 1/1980 | Nix et al. | 296/39 |
| 4,245,863 | 1/1981 | Carter | 296/39 |
| 4,279,439 | 7/1981 | Cantieri | 296/39 |
| 4,333,678 | 6/1982 | Munoz et al. | 296/39 |
| 4,336,963 | 6/1982 | Nix et al. | 296/39 |
| 4,341,412 | 7/1982 | Wayne | 296/39 |
| 4,428,306 | 1/1984 | Dresen et al. | 108/53.3 |
| 4,505,508 | 3/1985 | Carter et al. | 296/39 |
| 4,575,146 | 3/1986 | Markos | 296/39 |
| 4,693,507 | 9/1987 | Dresen et al. | 296/39 |

OTHER PUBLICATIONS

"Tiny Graphite 'Tubes' Create High Efficiency Conductive Plastics" Bernie Miller.

Primary Examiner—Gary C. Hoge
Attorney, Agent, or Firm—Lathrop & Clark LLP

[57] ABSTRACT

A pickup truck cargo bed liner is disclosed which is vacuum formed of unitary plastic and adapted to fit within and protect the contours of a pickup truck cargo bed. An electrically conductive plastic film material is co-formed with and integrally adhered to the plastic forming the liner to provide an electrically conductive film thereon for preventing and dissipating static electricity buildup on the liner surface. Conductive means provide an electrically conductive contact between the conductive plastic film and a normally grounded portion of the vehicle.

24 Claims, 1 Drawing Sheet

STATIC DISSIPATING PLASTIC TRUCK CARGO BED LINER

FIELD OF THE INVENTION

This invention relates to molded plastic protective liners for pickup truck cargo beds.

BACKGROUND OF THE INVENTION

Pickup trucks have been used for many years as working vehicles. In recent years pickup trucks have become increasingly popular as family transportation vehicles, because of their dual ability to haul passengers and cargo. The cargo bed surfaces of pickup trucks are generally finished with paint by the manufacturer. If the painted surfaces are unprotected, they can be scratched from cargo impact or deteriorated by weather or corrosives, seriously detracting from the value of the trucks. Whether a pickup truck is used as a working vehicle or as a family transportation vehicle, it is important to keep the surface of the cargo bed in satisfactory condition.

Various cargo bed liners used to protect the surface of cargo beds are described in prior art patents. One piece molded plastic truck liners comprising a front wall, opposing side walls and a bottom wall are shown in U.S. Pat. Nos. 4,592,583 to Dresen, et al., 4,341,412 to Wayne, 4,336,963 to Nix, et al., 4,181,349 to Nix, et al., 4,047,749 to Lambitz, and 3,814,473 to Lorenzen. All of the above patents show molded plastic liners which in practice have usually been thermoformed from high density polyethylene which has excellent strength, toughness and durability, and will withstand the normal expected weather extremes to which a pickup truck likely is exposed in normal use.

During the past 15 years in excess of 10 million unitary molded plastic bed liners have been sold and installed in pickup trucks in the United States. Plastic bed liners have in that period become one of the most common OEM and after market accessories purchased by pickup truck owners to protect the value of their pickup trucks. Very recently it has been reported that in a handful of cases, explosions have occurred while gas cans resting on plastic surfaces were being filled with gasoline. While the causes of such explosions have not been established, it has been theorized that such explosions have been caused or may be caused in the future by the build up of static electricity during refueling of gas containers resting on plastic bed liners.

Therefore, a need is perceived to provide a one-piece plastic protective cargo bed liner which will prevent and dissipate static electricity buildup on the liner surface.

SUMMARY OF THE INVENTION

The present invention is summarized in a protective molded plastic truck bed liner formed from the preferred high density polyethylene plastic material and having an integral electrically conductive surface. The truck bed liner may be formed with all of the features of existing bed liners, and retains all of the strength, toughness, resilience and durability which have made molded plastic bed liners so popular with pickup truck owners. A selected thermoplastic material having an electrically conductive material incorporated therein is co-formed with the upper surface of the plastic forming the liner to provide a conductive film thereon, the conductive film being in the form of a plastic integrally adhered to the liner upper surface.

It is an object of the present invention to provide a plastic truck cargo liner having an integral, durable static dissipating interior surface.

It is a further object of the present invention to provide a plastic protective truck cargo liner having a bottom wall with a durable, conductive surface and means for connecting the conductive surface to the surrounding metal truck bed in electively conductive relation.

It is a further object of the invention to provide a plastic protective truck cargo liner having a conductive film of plastic with conductive material incorporated therein integrally adhered to the liner upper surface.

It is an additional object of the invention to provide a plastic protective truck cargo liner having a conductive film of plastic integrally adhered to at least a portion of the liner upper surface in dimensionally stable relation.

Further objects, features and advantages of the invention will be apparent from the following detailed description when taken in conjunction with the accompanying drawings.

DESCRIPTION OF THE PREFERRED EMBODIMENT

Figure 1:
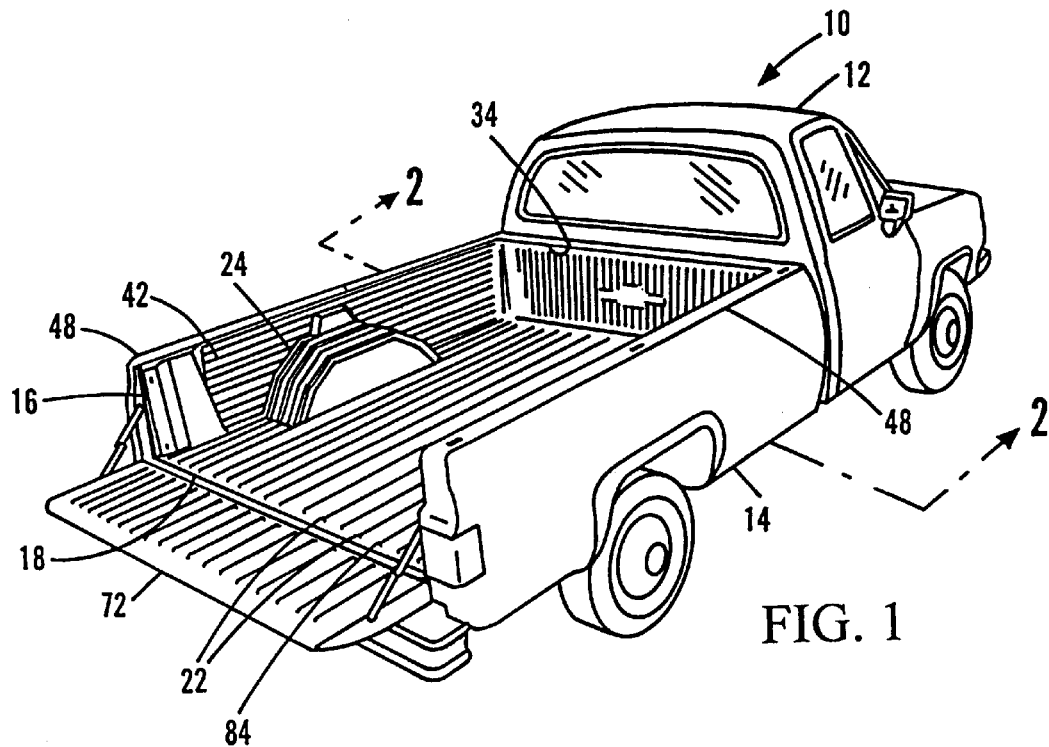
FIG. 1 is a perspective view of a cargo bed liner of the present invention installed in a pickup truck.

FIG. 1 illustrates a conventional pickup truck 10 having a cab 12 and a truck cargo bed 14. A preferred embodiment of the protective cargo bed liner 16 of the invention is installed within the truck cargo bed 14.

Figure 2:
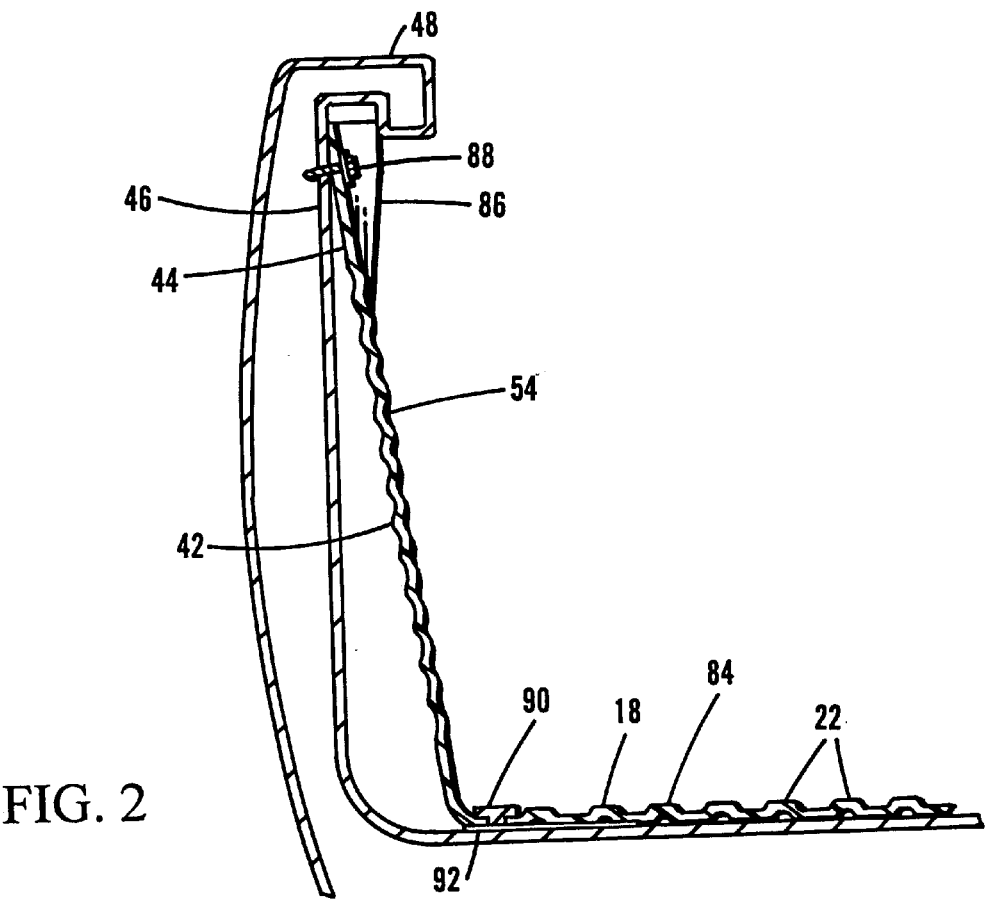
FIG. 2 is a fragmentary sectional view taken substantially along line 2—2 of FIG. 1.

The truck bed liner 16 is formed in a conventional manner of high density polyethylene in a single, integral unit, and has a liner bottom wall 18 which is adapted to fit on and substantially cover the full width of the truck cargo bed floor. The liner bottom wall 18 will normally have a width substantially as great as the distance between the truck side rails. As shown in FIG. 2, the liner bottom wall 18 contains a plurality of separate, inverted U-shaped longitudinal corrugations 22.

The truck bed liner 16 also has two liner wheel wells 24 formed in the liner bottom wall 18 at opposite sides thereof. The liner wheel wells 24 are adapted to accommodate the truck cargo bed rear wheel wells (not shown).

A liner front wall 34 is connected to and extends upwardly from the liner bottom wall 18. Two liner side walls 42 are connected to the liner bottom wall 18 and wheel wells 24 and also the liner front wall 34 at opposite sides thereof. The side walls 42 each have an upper margin 44 which is preferably adapted to fit flush against the cargo bed wall 46.

As shown in FIG. 2, the side walls 42 may preferably have one or more protrusions 86 at their upper margins 44 which protrude inwardly to engage an adjacent truck bed surface beneath the truck cargo bed side rail 48, to effectively maintain the adjacent portions of the liner upper margin 44 snugly against the cargo bed wall 46 beneath the truck side rail 48.

Another preferred form of truck bed liner (not shown), of the type generally shown in U.S. Pat. No. 4,341,412 to Wayne, has side walls which extend upwardly inside the truck cargo bed side rails, and flanges which extend outward over the tops of the truck rails to cover and protect the rails. This invention is equally useful with both under-the-rail and over-the-rail bed liner side wall designs as those designs are generally known to the bed liner industry.

The inside working surfaces 54 of the cargo bed liner of the present invention are provided with an integral conductive film 84 of material. Such a film of material will dissipate and prevent build up of static electricity from the working surface to any portion of the surrounding grounded truck cargo bed to which it is conductively connected or in conductive contact. The film 84 may be advantageously provided by laminating the film to the upper surface of the high density polyethylene sheet during extrusion forming of the sheet prior to vacuum forming the liner from the sheet. Suitable materials capable of being bonded to polyethylene and providing such a conductive surface include polyethylene, the preferred material, and other thermoplastic materials well known to the plastics and thermoforming industries. The disclosure of U.S. Pat. No. 4,693,507 to Dresen, et al., incorporated herein by reference, discloses a suitable co-extrusion process. The thickness of the co-extruded film surface may be selected and varied to produce the optimum combination of forming conditions and performance in use.

The surface film material may be formed of the preferred thermoplastic material containing an effective portion of an electrically conductive material such as graphite fibrils, carbon black metal powder or filaments, or the like. The particular concentration of the electrically conductive material in the thermoplastic material will be selected to optimize performance, cost and forming considerations.

The surface film material may also be selected to optimize the appearance of the exposed film surface, as well as other surface characteristics such as co-efficient of friction.

By incorporating conductive material only in the thin surface film of the bed liner, the inherent characteristics of the polyethylene bed liner substrate will be substantially unchanged from the currently popular polyethylene bed liner. Whatever additional cost is incurred from the addition of the selected electrically conductive material is minimized because the conductive material is only incorporated in the thin film, not the entire thickness of the bed liner substrate. Whatever additional stiffness or rigidity is imported to the film by the conductive material will not unduly affect the flexibility or formability of the underlying bed liner substrate.

As indicated above, conductive means must be provided to conduct static electricity from the liner conductive film working surface to the surrounding metal truck cargo box. Preferred conductive means are the protrusions 86 in the upper margin 44 of the preferred bed liner under-the-rail side walls 42 shown in FIG. 2. Several such protrusions 86 pressed against the steel material beneath the truck rails 48 would likely insure that the liner conductive surface film 84 would remain conductively engaged with the grounded truck cargo box in all use conditions.

Other conductive means, such as metal screw fasteners 88 and rivet type metal contacts 90 extending from electrical contact with the surface film 84 through the liner substrate material to a metal contact or flexible strap contact 92 which will maintain electrical contact with the underlying truck cargo box floor, are illustratively shown in FIG. 2, although it should be understood that normally only one such type of illustrated conductive means would be used (though several of the selected conductors could be employed to achieve redundancy under adverse use conditions).

The film of any of the above materials may also be caused to adhere to the polyethylene surface by conventional use of adhesives or a thermal attachment process before or during the vacuum forming of the liner.

As suggested above, the unitary plastic liner 16 is preferably formed in a mold from a sheet of heated polyethylene by a conventional thermoforming process. In that process, the thermoforming vacuum mold is a one-sided mold having vacuum ports provided therein to draw the heated sheet of material against the mold. The polyethylene sheet from which the liner is formed is conventionally made by heating a quantity of pellets of polyethylene until the heated material becomes liquified and of suitable viscosity, extruding the material though an extrusion die and forming rolls which lay the extruded material out in a sheet of desired width and thickness, and cooling the sheet. The cooled sheet is then cut into planar blanks of desired size from which the truck bed liners will be formed.

In carrying out the present invention, a thin film of conductive thermoplastic material as previously described is preferably co-extruded with a polyethylene substrate in a conventional manner to form a sheet of polyethylene having a film of approximately 25 to 30 thousandths inch thick, or such other thickness as is found optimal, on one side thereof. During such co-extrusion the heated polyethylene substrate material and the similarly heated thermoplastic film material with incorporated electrically conductive material mixed therein are maintained at proper viscosities in accordance with conventional co-extrusion techniques to cause the materials to flow together evenly and form molecular bonds between the film material and the substrate material.

When a film is used which substantially resembles the substrate sheet material such as high density polyethylene, it is possible to co-extrude (or laminate during extrusion) the film on less than all of the substrate sheet material, without adverse visual effects. Accordingly, the film 84 may be centered on the substrate sheet and of sufficient width only to cover all portions of the sheet that are formed into the liner bottom wall 18, since the bottom wall 18 is the potion of the liner on which a static dissipating surface is most advantageous. Because portions of the sheet will be drawn in unequal amounts during thermoforming due to irregularities in the liner design, particularly near the corners between the liner front wall 34 and side walls 42, and near the liner wheel wells 24, the edges of the film 84 may be quite irregular on the liner 16. If the conductive film 84 has the same appearance as the underlying liner inside surface 54, the irregular edge of the film 84 will not be readily visible nor objectionable. Limiting the film 84 to only the width necessary to cover the liner bottom wall 18 will obviously result in material savings and reduction of costs, without loss of effective static dissipation performance. Alternatively, the film could be limited to only a portion of the liner bottom wall, if cost considerations require. In that case, a fueling area could be formed and/or marked on the bottom wall to warn and encourage users to confine fuel storage, transporting, and handling of fuel containers to that portion of the bottom wall surface.

A separate one-piece tailgate liner 72 may also be attached to the tail gate of the truck in a conventional manner. The tailgate liner 72 may also advantageously include the conductive static dissipating film 84, and conducting means such as fasteners 88 or other suitable means for conductively connecting the film 84 to the grounded steel truck tailgate.

While the conductive film 84 has been illustrated and described on a preferred plastic truck body liner, it is understood that the anti-slip frictional film of the invention may be incorporated in thermoformed plastic truck bed liners of any desired shape or style. If is also understood that the invention may advantageously be employed in liners for sport utility vehicles and passenger vans and mini-vans, wherein fuel containers may be transported and handled.

It is understood that the invention is not confined to the particular construction and arrangement of parts herein illustrated and described, but embraces all such modified forms thereof as come within the scope of the following claims.

I claim:

1. A static dissipating protective truck cargo bed liner of vacuum formed plastic comprising:

a plastic bed liner body, and a selected thermoplastic material incorporating an electrically conductive material co-formed with and integrally adhered to the upper surface of the plastic forming the liner body to provide an electrically conductive film thereon for dissipating static electricity.

2. A static dissipating bed liner as specified in claim 1, including conductive means for providing an electrically conductive contact between the conductive film and a normally grounded surface of the truck cargo bed when the liner is installed in the truck bed.

3. The static dissipating bed liner as specified in claim 1, wherein the conductive film was co-extruded with the plastic forming the liner prior to vacuum forming of the liner and is adhered to the plastic liner body by molecular bonding.

4. The static dissipating bed liner as specified in claim 1, wherein the conductive film was laminated to the plastic forming the liner during the extrusion forming of the plastic prior to vacuum forming and is adhered to the plastic by molecular bonding.

5. The static dissipating bed liner as specified in claim 1, wherein the conductive film is adhered to the plastic forming the liner by means of an adhesive applied prior to vacuum forming of the liner and film.

6. A static dissipating bed liner as specified in claim 1, wherein the conductive film is adhered to the plastic forming the liner by a thermal attachment process prior to vacuum forming of the liner.

7. A static dissipating bed liner as specified in claim 1, wherein the conductive film is applied to only a portion of the upper surface of the plastic forming the liner, which portion substantially includes a selected portion of the upper surface of the bottom wall of the liner.

8. A static dissipating bed liner as specified in claim 1, which is vacuum formed from a sheet of plastic having the conductive film adhered to only a portion thereof, the conductive film substantially covering a selected portion of the plastic forming the bottom wall of the liner.

9. A static dissipating bed liner as specified in claim 1, wherein the selected conductive material has a co-efficient of shrinkage sufficiently similar to that of the plastic forming the liner so that the elastomer film does not warp the plastic or separate therefrom during cooling.

10. A static dissipating protective vehicle liner of formed plastic and adapted to fit within and protect portions of the contour and materials of a vehicle body interior, comprising:

a plastic formed substrate, and a selected plastic material integrally adhered to the upper surface of the plastic substrate to provide an electrically conductive film thereon for dissipating static electricity, and conductive means for providing an electrically conductive contact between the conductive film and a normally grounded portion of the vehicle when the liner is installed in the vehicle.

11. A static dissipating liner as specified in claim 10, wherein the conductive film was co-extruded with the plastic forming the liner prior to forming of the liner and is adhered to the plastic liner body by molecular bonding.

12. The static dissipating liner as specified in claim 10, wherein the conductive film was laminated to the plastic forming the liner during the extrusion forming of the plastic prior to forming and is adhered to the plastic by molecular bonding.

13. The static dissipating liner as specified in claim 10, wherein the conductive film is adhered to the plastic forming the liner by means of an adhesive applied prior to forming of the liner and film.

14. The static dissipating liner as specified in claim 10, wherein the conductive film is adhered to the plastic forming the liner by a thermal attachment process prior to forming of the liner.

15. A static dissipating liner as specified in claim 10, wherein the conductive film is applied to only a portion of the upper surface of the plastic forming the liner, which portion substantially includes a selected portion of the upper surface of the liner.

16. A static dissipating liner as specified in claim 10, which is vacuum formed from a sheet of plastic having the conductive film adhered to only a portion thereof, the conductive film substantially covering a selected portion of the plastic forming the bottom wall of the liner.

17. A static dissipating liner as specified in claim 10, wherein the selected conductive material has a co-efficient of shrinkage sufficiently similar to that of the plastic forming the liner so that the elastomer film does not warp the plastic or separate therefrom during cooling.

18. A static dissipating protective truck cargo bed liner of vacuum formed plastic comprising:

a high density polyethylene plastic bed liner body, and a high density polyethylene plastic material incorporating an electrically conductive material co-formed with and integrally adhered to the upper surface of the plastic forming the liner body to provide an electrically conductive plastic film thereon for dissipating static electricity.

19. A static dissipating truck cargo bed liner as specified in claim 18, including conductive means for providing an electrically conductive contact between the conductive film and a normally grounded surface of the truck cargo bed when the liner is installed in the truck bed.

20. The static dissipating truck cargo bed liner as specified in claim 18, wherein the conductive film was co-extruded with the plastic forming the liner prior to vacuum forming of the liner and is adhered to the plastic liner body by molecular is bonding.

21. The static dissipating truck cargo bed liner as specified in claim 18, wherein the conductive film was laminated to the plastic forming the liner during the extrusion forming of the plastic prior to vacuum forming and is adhered to the plastic by molecular bonding.

22. The static dissipating truck cargo bed liner as specified in claim 18, wherein the conductive film is adhered to the plastic forming the liner by means of an adhesive applied prior to vacuum forming of the liner and film.

23. A static dissipating truck cargo bed liner as specified in claim 18, wherein the conductive film is adhered to the plastic forming the liner by a thermal attachment process prior to vacuum forming of the liner.

24. A static dissipating truck cargo bed liner as specified in claim 18, wherein the conductive film is applied to only a portion of the upper surface of the plastic forming the liner, which portion substantially includes a selected portion of the upper surface of the liner.

* * * * *